United States Patent
Schreiber et al.

(10) Patent No.: US 7,781,696 B2
(45) Date of Patent: Aug. 24, 2010

(54) METHOD FOR JOINING COMPONENTS IN TITANIUM ALUMINIDE BY BRAZING

(75) Inventors: Karl Schreiber, Mellense (DE); Gunther Jakobi, Rangsdorf (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 906 days.

(21) Appl. No.: 10/735,706

(22) Filed: Dec. 16, 2003

(65) Prior Publication Data

US 2004/0182843 A1 Sep. 23, 2004

(30) Foreign Application Priority Data

Dec. 24, 2002 (DE) ................ 102 61 073

(51) Int. Cl.
*B23K 26/20* (2006.01)
*B23K 26/32* (2006.01)

(52) U.S. Cl. .............. 219/121.64; 228/234.1; 228/262.72

(58) Field of Classification Search .............. 219/121.63–121.66, 121.85; 228/234.1, 228/262.72

See application file for complete search history.

(56) References Cited

U.S. PATENT DOCUMENTS

| | | | |
|---|---|---|---|
| 4,990,741 A * | 2/1991 | Moores et al. ......... | 219/121.64 |
| 5,318,214 A | 6/1994 | Lucas, Jr. et al. | |
| 5,340,015 A | 8/1994 | Hira et al. | |
| 5,343,014 A | 8/1994 | Ogino et al. | |
| 5,407,119 A * | 4/1995 | Churchill et al. ......... | 228/124.5 |
| 5,538,810 A * | 7/1996 | Kaun .................. | 429/129 |
| 5,609,288 A * | 3/1997 | Johnson ................ | 228/157 |
| 5,698,784 A * | 12/1997 | Hotelling et al. ......... | 73/504.16 |
| 5,785,775 A | 7/1998 | Smashey et al. | |
| 5,788,142 A | 8/1998 | Bigay et al. | |
| 5,873,703 A | 2/1999 | Kelly et al. | |
| 5,997,248 A * | 12/1999 | Ghasripoor et al. ...... | 415/173.4 |
| 6,053,398 A * | 4/2000 | Iizuka et al. ............ | 228/254 |
| 6,223,976 B1 | 5/2001 | Clement et al. | |
| 6,596,229 B2 * | 7/2003 | Lin et al. ............... | 420/502 |
| 6,596,963 B2 * | 7/2003 | Kelly .................... | 219/121.64 |
| 6,631,290 B1 * | 10/2003 | Guck et al. ............. | 600/509 |

FOREIGN PATENT DOCUMENTS

| | | |
|---|---|---|
| DE | 69122485 | 7/1992 |
| DE | 69212365 | 10/1992 |
| DE | 69606001 | 1/1997 |
| EP | 0342104 A1 * | 11/1989 |
| EP | 0508414 | 7/1996 |
| EP | 0904881 | 3/1999 |
| JP | 410220236 A * | 8/1998 |

OTHER PUBLICATIONS

Metals Handbook Ninth Edition, vol. 6, Welding, Brazing, and Soldering, pp. 1064-1066, copyright 1983.*
German Search Report dated Aug. 18, 2003.
Patent Abstracts of Japan, Bd. 010, Nr. 273 (M-518), Sep. 17, 1986 & JP 61 095769 A (Toshiba Corp.) May 14, 1986.
European Search Report dated Oct. 4, 2004.

* cited by examiner

*Primary Examiner*—Samuel M Heinrich
(74) *Attorney, Agent, or Firm*—Timothy J. Klima; Shuttleworth & Ingersoll, PLC

(57) ABSTRACT

A method for joining components in TiAl with a braze includes heating the braze with a laser.

25 Claims, 2 Drawing Sheets

METHOD FOR JOINING COMPONENTS IN TITANIUM ALUMINIDE BY BRAZING

This application claims priority to German Patent Application DE10261073.8, filed Dec. 24, 2002, which application is incorporated by reference herein in its entirety.

BACKGROUND OF THE INVENTION

This invention relates to a method for joining components in titanium aluminide by brazing.

Components in titanium aluminide (TiAl) are primarily known in the aeronautical sector. For example, turbine blades, bearings, casing parts and similar items are made of these materials.

A joining method for such components is shown in U.S. Pat. No. 5,318,214, for example. In this method, the TiAl components are joined by means of a braze which, together with the components, is heated in a furnace. This joining method is disadvantageous in that the requirement for a furnace (for example a vacuum furnace or a protective gas furnace) entails high equipment investment as the components are to be appropriately positioned relative to and pressed against each other. Such a method, therefore, does not make good commercial sense. A further disadvantage is the thermal impact on the components which may result in undesirable structural changes. Also, undesired distortion may occur, in particular when joining thin-gage sheets.

U.S. Pat. No. 5,785,775 shows an electric welding method for components made of titanium aluminides. This method may, however, cause cracking flaws in welds which must be removed in further, expensive processing operations (see U.S. Pat. No. 5,873,703 A).

A laser welding method for components in titanium aluminide using protective gas is described in Specification U.S. Pat. No. 4,990,741 A. This method also incurs high investment, and affects the structure of the components, as the components must be heated sufficiently to become molten at the weld joint for the welding process.

Summarizing, then, no commercially sensible method for the joining of components, in particular of titanium aluminide sheet, is currently available.

Furthermore, all known methods have the disadvantage that geometrically complex components, in particular sheet-metal structure parts, must be kept in position during the joining process while applying continuous pressure and maintaining stringent tolerances. The different heat expansion of the components to be joined, and of the holding and pressure-application devices used during the heating and the actual joining process, involves high equipment investment. This results in quite considerable manufacturing costs.

BRIEF SUMMARY OF THE INVENTION

This invention, in a broad aspect, provides a method of the type specified above which avoids the disadvantages of the state of the art and yields high-quality results, while being simply and inexpensively practicable.

It is a particular object of the present invention to provide solution to the above problems by the combination of the features described herein, with further objects and advantages being discussed below.

The present invention accordingly provides for the heating of the braze used in joining components in titanium aluminide by means of a laser beam. The method according to the present invention is characterized by a variety of merits.

The use of a laser source for fusing the braze enables the heat or energy input to be controlled very precisely. Since the energy of the laser beam, the shape of the laser beam and its position, for example, can be set and controlled with high accuracy, the braze can be melted in a highly controlled manner. The joining process in accordance with the present invention can, therefore, be executed without, or with very low, heat input into the components to be joined. This is advantageous in that the structure of the components is not affected in an undesired manner. Furthermore, dimensional deviations of the components by heat expansion are precluded since virtually no thermal elongation or shrinkage occurs.

The method according to the present invention is particularly well suited for the joining of TiAl sheets. Here, it is particularly advantageous that the sheets, or the components, can be butt joined. Lapped joints or similar joints can, therefore, be dispensed with, the production of these in components made of these materials under stringent accuracy requirements invariably incurring high effort and cost. In the state of the art, such lapped joints can only be produced by superplastic forming or hot forming, for example.

The method according to the present invention allows protective-gas or vacuum furnaces to be dispensed with. The holding or clamping devices for the components can be of very simple design since joining is accomplished at room temperature and under atmospheric pressure.

In accordance with the present invention, the components can also be joined with a brazing gap, allowing close tolerances to be dispensed with. Edge misalignment and gaps are safely and easily bridged by the melting braze. Therefore, according to the present invention, a simple joint configuration of the butt type is sufficient in process preparation.

In some cases, gaps between the components to be joined may even be desired since the braze, whose plastic deformation characteristics are superior to those of the base material, can take up the shrinkage stresses which occur as the braze cools down, thus protecting the brittle base materials against micro and macro cracking. This eliminates the need for the fairly complex pre-heating and cooling regime for laser welding of TiAl described in the state of the art.

The method according to the present invention enables structures of TiAl components to be manufactured in a very cost-effective manner. Since these components are not cold formable, the present invention provides for simple and cost-effective joining even of complex structural components, in particular in sheet metal.

Since the braze in the inventive method melts only in the immediate area of the position heated by the laser beam, expensive, high-temperature or corrosion-resistant special holding devices can be omitted. Furthermore, no pressure needs to be applied to the joining areas during the joining process. Summarizing, then, the process can be performed at room temperature and under atmospheric pressure, with a protective gas atmosphere being required only locally in the region where the braze is affected by the laser.

In a particularly favorable manner, a ductile braze (material) is used in accordance with the present invention. If applicable, this braze can take up, or dissipate, thermal stress or elongation strain, avoiding detriment to the components.

A further advantage according to the present invention lies in the fact that the volume and weight share of the braze is very low and that additional laps, joints or similar need not be produced in the components. This results in a considerable weight saving over the methods known from the state of the art, with a high specific component strength value virtually being maintained.

BRIEF DESCRIPTION OF THE DRAWINGS

The present invention is more fully described in light of the accompanying drawings showing a preferred embodiment. In the drawings, FIG. 1 (Prior Art) is a braze joint configuration in accordance with the state of the art.

DETAILED DESCRIPTION OF THE INVENTION

This detailed description should be read in conjunction with the summary of the invention above.

Figure 1:
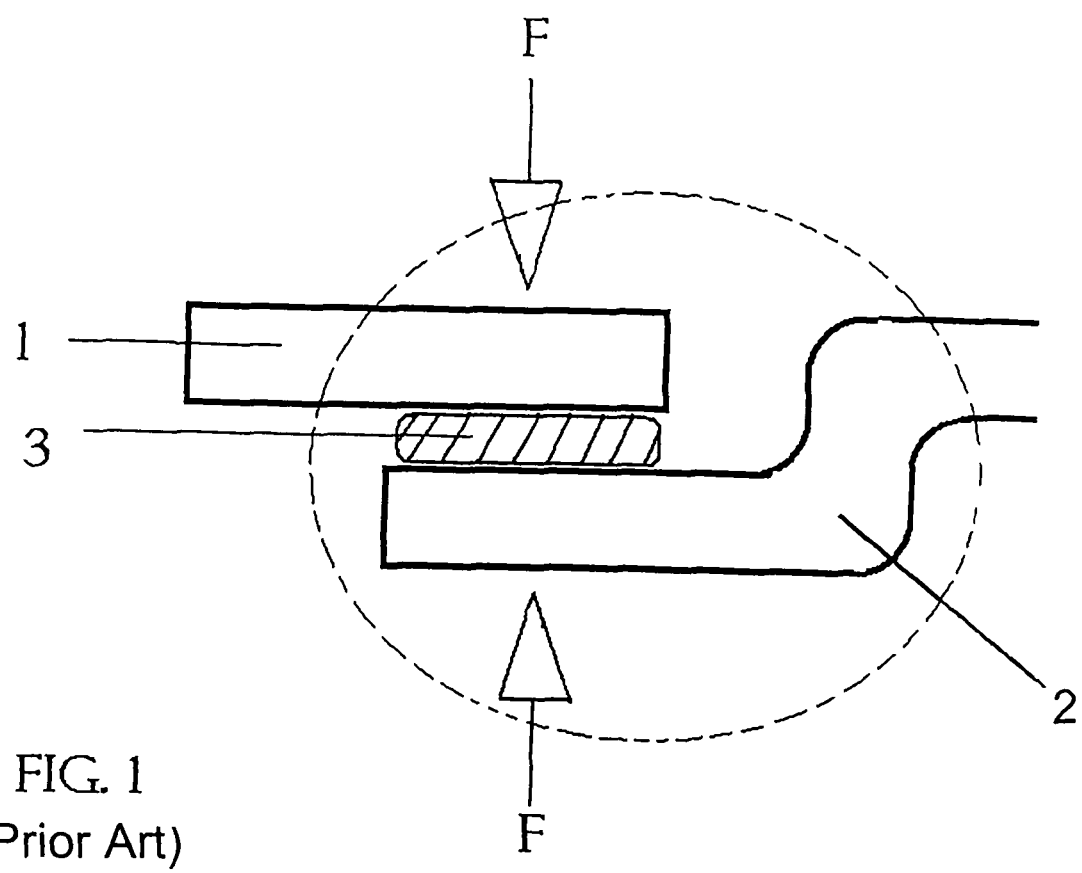

FIG. 1 (Prior Art) shows two components 1, 2 which are to be joined by means of a braze 3. As is apparent, a lapped joint 6 must be produced on at least one of the components. Furthermore, the arrowheads F schematically illustrate the force to be applied by a pre-clamping device (not shown) in order to precisely join the two components 1 and 2 when the braze 3 melts in a furnace atmosphere.

Figure 2:
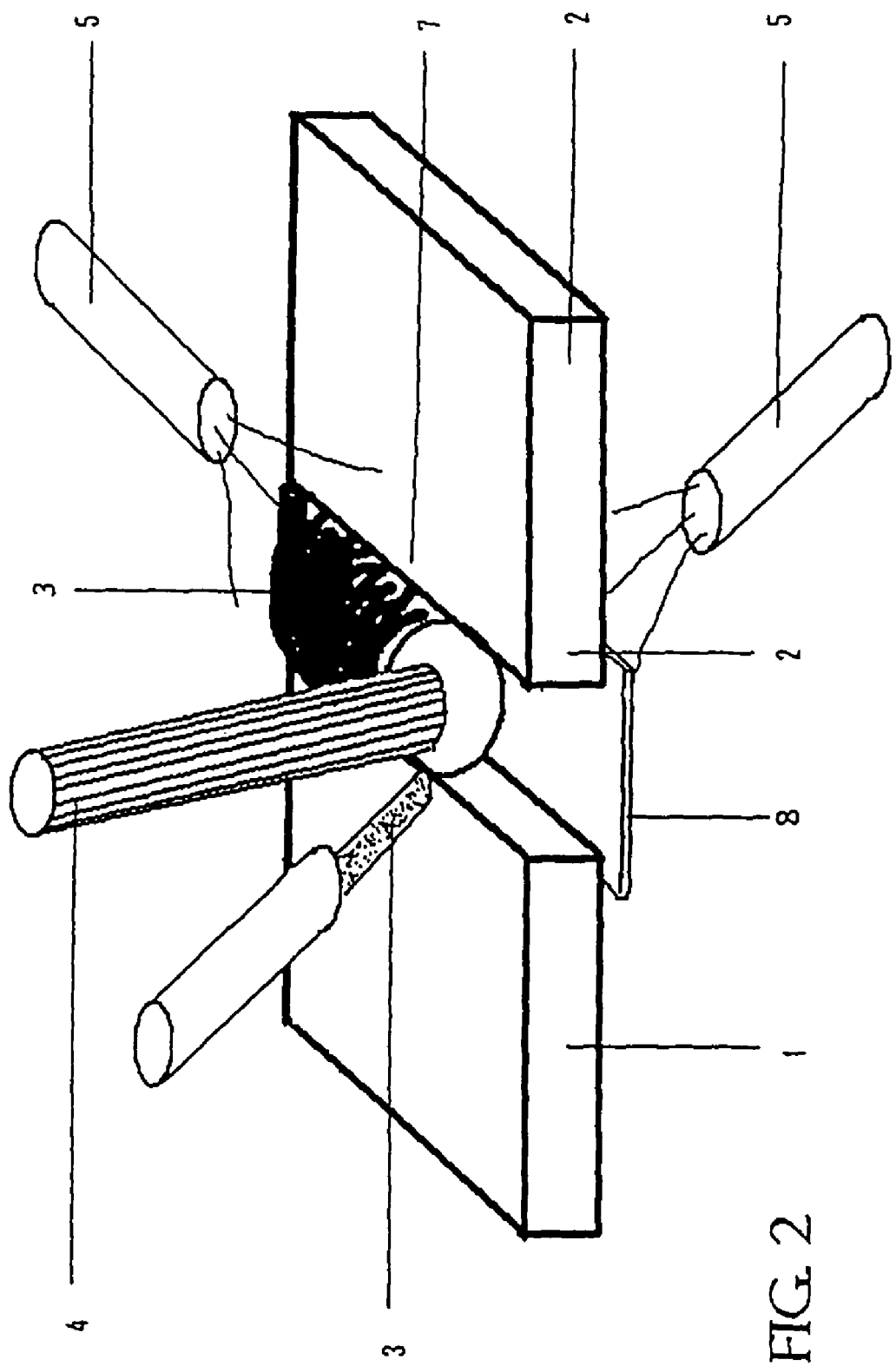
FIG. 2 is a simplified, schematic representation of the joining method according to the present invention.

FIG. 2 shows an embodiment in which the components 1, 2 are butt joined by means of the braze 3. A laser 4 is shown schematically. Also shown is the input of protective gas 5 into the area heated by the laser 4. As becomes apparent from the figure, virtually no heat is input into the edge zone 7 of the components 1, 2. Only the braze 3 must be melted to adhere to the components 1 and 2; the components 1 and 2 need not be heated for the brazing process, and even if heated, the heating is minor and not sufficient to melt the components, as would be required in a welding process, or even sufficient to change the structure of the components 1 and 2 or substantively change the dimensions of the components due to thermal expansion. The ductile braze 3 selected can deform when subjected to stresses during the joining process, as illustrated by the convex surface areas. For wide joining gaps, the molten braze 3 is protected from sagging by means of a backing 8 in the form of a bar or plate on the back of the seam.

What is claimed is:

1. A method for the joining of TiAl components with a braze having a melting temperature lower than a melting temperature of the TiAl components, comprising:
   aligning the TiAl components to form a braze joint therebetween into which molten braze can be deposited;
   depositing the braze into the braze joint;
   directly heating only the braze with a laser beam to a temperature at which the braze is molten but which temperature is below a melting temperature of the TiAl components, so that the braze adheres to the TiAl components;
   preventing primary heat input into the TiAl components and limiting heating of the TiAl components to an amount insufficient to 1) change a structure of the components; and 2) substantively change dimensions of the components due to thermal expansion.

2. A method in accordance with claim 1, wherein TiAl sheets are joined.

3. A method in accordance with claim 2, wherein the components are joined with a braze gap.

4. A method in accordance with claim 3, wherein the components are butt-joined.

5. A method in accordance with claim 4, wherein joining is accomplished under protective gas.

6. A method in accordance with claim 5, wherein the components are positioned relative to each other at room temperature and under atmospheric pressure.

7. A method in accordance with claim 6, wherein a ductile braze is used.

8. A method in accordance with claim 7, wherein the molten bath is protected from sagging by a backing bar.

9. A method in accordance with claim 8, wherein the braze is fed in the form of a wire.

10. A method in accordance with claim 8, wherein the braze is fed in the form of powder.

11. A method in accordance with claim 1, wherein the components are joined with a braze gap.

12. A method in accordance with claim 1, wherein the components are butt-joined.

13. A method in accordance with claim 1, wherein joining is accomplished under protective gas.

14. A method in accordance with claim 1, wherein the components are positioned relative to each other at room temperature and under atmospheric pressure.

15. A method in accordance with claim 1, wherein a ductile braze is used.

16. A method in accordance with claim 1, wherein the molten bath is protected from sagging by a backing bar.

17. A method in accordance with claim 1, wherein the TiAl components are joined with a filled joint.

18. A method in accordance with claim 1, wherein the TiAl components are joined by an overlapping joint.

19. A method in accordance with claim 1, wherein the TiAl components are joined without a braze gap.

20. A method in accordance with claim 2, wherein the TiAl components are joined with a filled joint.

21. A method in accordance with claim 2, wherein the TiAl components are joined by an overlapping joint.

22. A method in accordance with claim 2, wherein the TiAl components are joined without a braze gap.

23. A method in accordance with claim 1, wherein the braze is melted prior to deposition into the braze joint.

24. A method in accordance with claim 1, wherein the braze is melted after deposition into the braze joint.

25. A method in accordance with claim 1, wherein the braze is melted during deposition into the braze joint.

* * * * *